US011848635B2

(12) United States Patent
Russell

(10) Patent No.: US 11,848,635 B2
(45) Date of Patent: *Dec. 19, 2023

(54) METALLURGICAL STEEL POST DESIGN FOR SOLAR FARM FOUNDATIONS AND INCREASED GUARDRAIL DURABILITY

(71) Applicant: Thomas E. Russell, Keene, NH (US)

(72) Inventor: Thomas E. Russell, Keene, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/501,604

(22) Filed: Oct. 14, 2021

(65) Prior Publication Data

US 2022/0038044 A1 Feb. 3, 2022

Related U.S. Application Data

(63) Continuation of application No. 15/622,138, filed on Jun. 14, 2017, now Pat. No. 11,177,763.

(51) Int. Cl.
*H02S 20/10* (2014.01)
*E01F 15/04* (2006.01)
*E02D 27/42* (2006.01)
*F24S 25/12* (2018.01)
*F24S 25/617* (2018.01)
*F24S 25/13* (2018.01)

(52) U.S. Cl.
CPC .......... *H02S 20/10* (2014.12); *E01F 15/0461* (2013.01); *E02D 27/42* (2013.01); *F24S 25/12* (2018.05); *F24S 25/13* (2018.05); *F24S 25/617* (2018.05)

(58) Field of Classification Search
CPC ...... H02S 20/10; E01F 15/0461; E02D 27/42; F24S 25/12; F24S 25/13; F24S 25/617; Y02E 10/47; Y02E 10/50
See application file for complete search history.

(56) References Cited

U.S. PATENT DOCUMENTS 3,001,897 A 9/1961 Nachtman
3,330,082 A 7/1967 Webb
(Continued)

FOREIGN PATENT DOCUMENTS

DE 10 2009 037 978 A1 3/2011
DE 10 2012 014 233 A1 4/2013
(Continued)

OTHER PUBLICATIONS

Notification of Transmittal of the International Search Report and the Written Opinion of the International Searching Authority dated Sep. 4, 2018, in connection with corresponding International Application No. PCT/US18/37240 (13 pgs.).
(Continued)

*Primary Examiner* — Babajide A Demuren
(74) *Attorney, Agent, or Firm* — Maier & Maier, PLLC

(57) ABSTRACT

A high-grade post or pile system for the foundation of a solar array, which may facilitate the installation of a solar array rack in more corrosive soils. Such a post may also satisfy the need for a foundation able to resist ground forces, in particular the effects of wind on the exterior of the array, and may reduce problems with beam refusal. The post may be used in other applications such as guardrail posts. In contrast to existing posts for solar arrays, the high-grade post may be formed from higher-grade steel.

4 Claims, 7 Drawing Sheets

(56) References Cited

U.S. PATENT DOCUMENTS

| | | | |
|---|---|---|---|
| 4,966,631 A * | 10/1990 | Matlin | H02S 40/36 |
| | | | 136/251 |
| 4,995,377 A * | 2/1991 | Eiden | F24S 30/48 |
| | | | 353/3 |
| 5,628,495 A | 5/1997 | Gandara | |
| 5,637,205 A | 6/1997 | Krupicka | |
| 6,219,990 B1 | 4/2001 | Snyder et al. | |
| 6,379,821 B2 | 4/2002 | Kushida et al. | |
| 7,832,713 B2 * | 11/2010 | King | E01F 15/0438 |
| | | | 404/6 |
| 7,850,391 B2 * | 12/2010 | Omar | E01F 13/12 |
| | | | 404/6 |
| 8,240,109 B2 * | 8/2012 | Cusson | F24S 80/70 |
| | | | 52/173.3 |
| 8,468,755 B2 * | 6/2013 | Zuritis | F24S 25/65 |
| | | | 52/153 |
| 8,550,419 B2 * | 10/2013 | Hausner | F24S 25/70 |
| | | | 248/370 |
| 8,858,112 B2 * | 10/2014 | Wallace | E01F 15/0461 |
| | | | 404/9 |
| 9,010,042 B2 | 4/2015 | Anderson et al. | |
| 9,593,867 B2 | 3/2017 | Seery et al. | |
| 2001/0005010 A1 | 6/2001 | Larsen et al. | |
| 2003/0098096 A1 | 5/2003 | Petersen et al. | |
| 2009/0115209 A1 | 5/2009 | Roth | |
| 2010/0230652 A1 | 9/2010 | Calton et al. | |
| 2010/0243978 A1 | 9/2010 | Leonhardt et al. | |
| 2011/0024005 A1 | 2/2011 | Suwabe | |
| 2011/0272367 A1 | 11/2011 | Kufner | |
| 2011/0290305 A1 | 12/2011 | Hoffmann et al. | |
| 2012/0124922 A1 | 5/2012 | Cusson et al. | |
| 2013/0076017 A1 | 3/2013 | Gallagher, Jr. | |
| 2014/0014155 A1 | 1/2014 | Seery et al. | |
| 2014/0099456 A1 | 4/2014 | Raghavendran et al. | |
| 2014/0215953 A1 | 8/2014 | Sawaki | |
| 2014/0230360 A1 | 8/2014 | Naito | |
| 2015/0144580 A1 | 5/2015 | Kitano et al. | |
| 2015/0240112 A1 | 8/2015 | Hulteen et al. | |
| 2015/0314345 A1 | 11/2015 | Ichikawa et al. | |
| 2016/0145731 A1 | 5/2016 | Sachdev et al. | |
| 2016/0230474 A1 | 8/2016 | Hess et al. | |
| 2016/0340851 A1 | 11/2016 | Sapsai et al. | |
| 2018/0367086 A1 | 12/2018 | Russell | |

FOREIGN PATENT DOCUMENTS

| | | | |
|---|---|---|---|
| WO | WO-2008148066 A1 * | 12/2008 | F24J 2/5205 |
| WO | 2013082125 A1 | 6/2013 | |
| WO | 2016/073343 A1 | 5/2016 | |
| WO | 2017065466 A1 | 4/2017 | |
| WO | WO-2017065465 A1 * | 4/2017 | H01L 31/04 |

OTHER PUBLICATIONS

Gerdau Ameristeel, "Bantam Beam®.", Printed: May 15, 2017, URL: https://www.gerdau.com/northamerica/enproducts-and-services/products/bantam-beam#ad-image-0, 2 pgs.

Richard Morales, "Design for Durability.", Gerdau Ameristeel., Printed: May 15, 2017, URL: http://www.Ibfosterpilingproducts.com/pdf/Design_for_Durability.pdf, 38 pgs.

The Extended European Search Report dated May 10, 2021, including the Supplementary European Search Report and the European Search Opinion, in connection with corresponding EP Application No. 18816767.0 (9 pp.).

European Office Action dated Sep. 21, 2022 in Application No. 18 816 767.0-1002 (5 pages).

Examination Report dated Mar. 30, 2023, in corresponding Australian Application No. 2018284352, 4 pages.

Office Action dated Jun. 9, 2023, in corresponding Mexican Application No. MX/a/2019/015082, 6 pages.

* cited by examiner

100

METALLURGICAL STEEL POST DESIGN FOR SOLAR FARM FOUNDATIONS AND INCREASED GUARDRAIL DURABILITY

CROSS-REFERENCE TO RELATED APPLICATIONS

The present patent application claims benefit and priority to U.S. patent application Ser. No. 15/622,138 filed on Jun. 14, 2017, which is hereby incorporated by reference into the present disclosure.

BACKGROUND

There are an increasing number of solar farms being developed throughout North America and the world. The output of photovoltaic power stations the world over has increased progressively over the last decade, with more and larger solar farms being continuously developed and frequently setting new capacity records.

For example, in 2006, the largest photovoltaic solar park was Erlasee Solar Park in Germany, with a capacity of 11.4 megawatts. Two years later, in 2008, the world's largest solar park, Olmedilla Photovoltaic Park in Spain, had a capacity of 60 megawatts—more than five times the size. This massive amount of interest in solar energy has continued to the present day, where the world's largest solar park (Kurnool Ultra Mega Solar Park in India, set to come fully online sometime in 2017) has a capacity of 900 megawatts or more.

One obstacle to the growth of solar energy farms, however, has been the significant amount of land that they require. Most solar farms require hundreds if not thousands of acres of land in order to produce enough power for a small city; for example, the "Comanche Solar" project in Colorado anticipates using over 450,000 panels, spread across 900 acres of land, in order to produce 156 megawatts of electrical energy. Once generated, this electrical energy must then be transmitted to energy demand centers—which are, ideally, in relatively close proximity to the solar farm itself.

The large amount of land required by solar power generation has meant that, in the United States, almost all large-scale solar development has been in the Southwest, where many large cities, like San Diego and Phoenix, are relatively close to empty stretches of desert or scrubland that are ideal for solar development. However, the many other cities across the country that are interested in forging ahead with solar power do not necessarily have large swathes of cheap, unused land nearby, and have had to turn to other solutions like rooftop solar.

An increasingly common site for solar development has been "brownfields," contaminated land or closed landfills that are often unusable for other development. These reclaimed brownfields, or "brightfields," often have the advantage of being close to a city center; many are former municipal landfills or former industrial sites that have highly corrosive polluted soils. Further, many environmental concerns have been raised about building on other potential sites, such as desert habitat or farmland, and the use of brownfields mitigates those concerns. Exelon City Solar, in Chicago, Illinois, is one such example of a "brightfield;" it is the largest urban solar park in the United States, and is located on a former industrial site which had previously sat vacant for 30 years.

The use of these sites has, however, presented a number of problems for development. For example, in many cases, there may be no ground penetration allowed at a brownfield site that was formerly a landfill, as doing so could puncture the landfill cap. In other cases, such as when the brownfield site was formerly an industrial park, ground penetration may be allowed but may be undesirable, because the soil at the site might be polluted and highly corrosive. As solar arrays need to be coupled to a foundation in order to satisfy design requirements (for example, the design criteria for solar development generally requires that the farm's foundations be capable of withstanding certain "ground forces," such as high wind speeds, snow loads, and seismic activity, for a minimum of 25 or 30 years), certain workarounds have been created in order to ensure that the solar farm's foundations can be installed as easily and cheaply as possible on sites where there cannot be ground penetration or where the site has extremely corrosive soil.

One common design is a "ballasted foundation," used when there is not any ground penetration allowed. In such a foundation, the rack of the solar array is attached to a man-made above-ground foundation, typically a structure of heavy concrete blocks. Typically, such a system has two vertical posts connected to a single concrete block of approximately 2 ft by 2 ft by 8 ft. These systems can be very expensive and are typically not suitable or not recommended for smaller installations.

A more common design for solar farm foundations is the ground-mounted system. This design relies on ground penetration using any of a variety of penetrators. For example, these can include large hemispherical screws, helical piles, C-channel posts, or (most commonly) driven-steel I-beams. These I-beams are most commonly within a range of smaller W6×7 beams to larger W6×25 beams (using the ASTM A6 standard for I-beams, where the first number indicates depth in inches, and the second number indicates weight in lb/ft).

A major reason that the I-beams used for solar arrays fall within this range is that guardrail posts also fall within this range. When the first large-scale solar farms were being designed, engineers made use of the standard guardrail post as the basis for driven piles. This allowed existing equipment used for driving guardrails (such as spiral-type or hydraulic-type pile drivers intended for driving guardrails) to be used in this application as well. This remains the most common method in use today.

As such, where possible, solar piles are standard guardrail posts. These are I-beams having a size of W6×8.5 or W6×9 (8.5 lbs/9 lbs per linear foot respectfully), which have been hot dip galvanized per ASTM A123, and which have a steel KSI grade of 50. However, several factors might require a different section type to be used. In particular, these factors might include the ground forces that are applicable to the site's location, the density of the soil that the beams will be driven into, and the other properties of the soil.

For example, the selection of a section type used for a foundation intended to resist ground forces may depend on what ground forces the rack and panel of the solar array are expected to experience. This may vary from location to location or even from one part of the array to another. For example, typically the exterior of the array will experience greater wind forces. Thus, posts that are larger in size may be selected for the exterior of the array. The interior of the array will typically have less wind load requirements, and the posts may thus be smaller in size.

The post may also be varied based on the density of the soil that the beams are intended to be driven into. Ground-mounted systems can be used in any of a variety of lands or soils, such as bedrock, clay, or cobblestone. Soils may be loose, sand-like, and expansive, or may be dense, firm, and hard-packed. Soils may also be highly rocky or otherwise heterogeneous, and may have, for example, bits of ledge that might cause refusals of driven piles. This is in keeping with the variety of potential sites for solar arrays, including repurposed farm fields, empty lots, commercial parking lots, landfills, and simple open spaces with minimal shading, each of which may have been originally built on a different type of soil, and some of which may introduce debris or other obstacles. Typically, a subsurface investigation must be conducted in order to determine the attributes of the soil in order for a proper beam size to be selected. Generally, when the soil is very rocky, or when driven piles may otherwise be subject to refusal, using a thicker section type than was required by design can often be another solution.

The post may also be varied based on the corrosivity of the soil in question. For example, former agricultural lands may have highly-concentrated deposits of corrosive fertilizer. Coastal lands may have high concentrations of corrosive salts, and may have continuous wet and dry cycles. Reclaimed industrial lands or other brownfields may have highly corrosive soils due to decades of industrial pollution.

When an analysis of the soil indicates that corrosive elements are present (which is very common), and are present to such a degree that they may adversely affect the structural integrity of the steel post sections (based on the predicted ground force data) and the ability of the steel post sections to last for its intended lifetime (typically 25 years), there are two common solutions that may be used either alone or in combination.

First, in order to resist corrosion, an additional quantity of sacrificial anode may be applied to ensure that the sacrificial anode lasts for a longer period of time. The steel post may be hot dip galvanized (HDG) per ASTM A123, which specifies a minimum coating of zinc to be applied as specified per the thickness of the steel plate. ASTM A123 specifies a HDG minimum zinc coating of 3.9 mils per ¼ thickness of steel plate. (A thicker coating than the minimum can also sometimes be applied.)

Second, in order to provide additional sacrificial material, a thicker section type may be used than was initially required by design. This may provide additional sacrificial steel that may thus allow the steel post to meet or exceed its required longevity as prescribed by its design life.

Most commonly, the solution is to HDG the post. However, it is not uncommon to increase the size of the post by increasing the section type, in addition to and in conjunction with HDG, to thus provide redundant sacrificial material after the HDG has been exhausted.

SUMMARY

An alternative post or pile system for the foundation of a solar array may be disclosed. According to an exemplary embodiment, such a post may facilitate the installation of a solar array rack in more corrosive soils. Such a post may also satisfy the need for a foundation able to resist ground forces, in particular the effects of wind on the exterior of the array, and may reduce problems with beam refusal. In an exemplary embodiment, the post may be used in other applications; for example, in an exemplary embodiment, it may be desirable to use the post as a guardrail post, similar to how guardrail posts were originally used as posts for the foundations of solar arrays.

Existing I-beam posts used in the embedded foundations of solar farms are grade 50; that is, they are constructed from a steel that has a yield strength of 50 ksi. However, in an exemplary embodiment, an alternative post may be substituted that has a higher grade, such as grade 60 or higher. For example, in an exemplary embodiment, grade 80 may be used.

According to an exemplary embodiment, a pile used as a supporting post for a guardrail or a mounting rack of a solar array may be described. The pile may include a columnar pile body having an I-shaped cross section. The columnar pile body may be constructed from a grade 60 or grade 80 steel, or another such steel, as desired. As such, the columnar pile body may have a yield strength of at least 60 ksi.

According to an exemplary embodiment, the columnar pile body may be constructed so as to have an ASTM grade of HIGH STRENGTH ASTM A-656 Gr. 80, ASTM A-656 Gr. 80, or ASTM A-514 PLATE 100 ksi. This may replace the current material, which is produced at a grade having an ASTM reference of HIGH STRENGTH ASTM A-572 Gr. 50. According to an exemplary embodiment, the columnar pile body may be a proprietary beam such as a BANTAM BEAM. The columnar pile body may be galvanized using a hot dip galvanic coating, or may otherwise be coated in anode, as may be desired. Alternatively, the columnar pile body may be protected by another method, such as via the application of a protective epoxy coating or a protective zinc-rich epoxy/urethane coating to the surface of the columnar pile body. Alternatively, no protection may be applied, and the columnar pile body may include a sufficient amount of sacrificial material that no protection may be necessary. Other configurations of the columnar pile body may also be understood.

According to an exemplary embodiment, the pile may use a standard guardrail sizing, such as W6×8.5 or W6×9, which may allow the pile to be driven using a standard guardrail post driver, if desired.

In an exemplary embodiment, a solar array may have a plurality of such piles supporting it. In an exemplary embodiment, the solar array may have different piles on the outside and inside of the solar array, with the piles on the outside of the solar array being stronger than the piles on the inside of the solar array.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
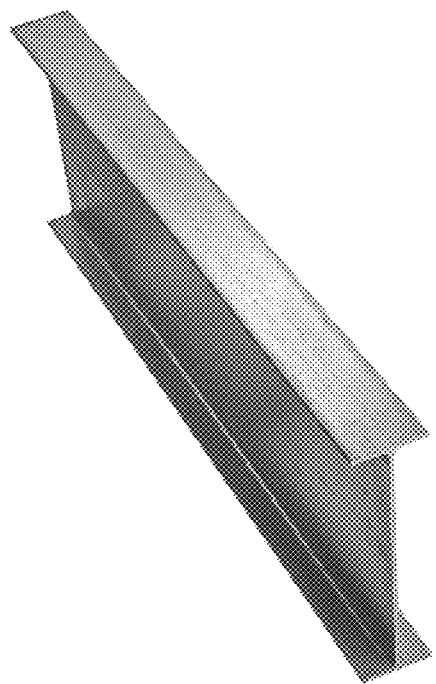
FIG. 1 is an exemplary embodiment of a BANTAM BEAM.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, several terms of art are explicitly defined herein for ease of reference. In particular, the "ultimate tensile strength" of a material is defined as the maximum stress a material withstands when subjected to an applied load. Dividing the load at failure by the original cross sectional area determines the value. The "yield strength" of a material is defined as the point at which the material exceeds the elastic limit and will not return to its original shape or length if the stress is removed. This value is determined by evaluating a stress-strain diagram produced during a tensile test.

According to an exemplary embodiment, and referring generally to the Figures, various exemplary implementations of a post for use in a foundation of a solar array may be disclosed.

Referring generally to the Figures, various exemplary embodiments of posts that may be used in the foundations of solar arrays may be disclosed. It is again noted that the existing I-beam posts used in the embedded foundations of solar farms are grade 50, which means that they are constructed from a steel that has a yield strength of 50 ksi. However, according to an exemplary embodiment, posts for the embedded foundations of solar farms may be constructed from a steel having a higher yield strength, such as 60 ksi or 80 ksi, or lower or higher as may be desired.

It is noted that, in virtually all other applications in which a high-tensile steel alloy is used, the overriding reason for doing so was to reduce the overall weight of the structure. High-tensile steel alloys tend to have approximately the same density as lower-tensile-strength steel alloys, meaning that a component constructed from the high-tensile steel alloy can be lighter while providing the same strength. This means that a beam constructed from high-tensile steel alloy can be used in an application where the high strength-to-weight ratio of the beam is a benefit; for example, such beams are often used in skyscrapers, wherein the large steel columns and horizontal I-beams used to construct the skyscraper need to be strong enough to support the weight of the stories above them, and light enough to lessen the stress on the stories below. Likewise, such beams may be used in applications where the beams would have to be transmitted by road or by another method where weight is a concern (such as air transport); for example, joists and framework for pre-fabricated homes generally requires the use of high-tensile steel, so that the joists and framework remain light enough to be transported by semi-tractor-trailer across highways and roads, and are strong enough to be lifted by crane and set on their final foundation. However, high-tensile steel alloys are more expensive than standard 50 ksi steel (if it were otherwise, the higher-tensile steel alloy would likely become the new standard) and as such historically have not seen use in applications in which the strength-to-weight ratio of the steel component is not a concern.

Turning now to exemplary FIG. 1, FIG. 1 displays an exemplary embodiment of a BANTAM BEAM 100. The BANTAM BEAM, manufactured by Gerdau Corporation, is a beam intended for use in the frames of manufactured homes and recreational vehicles, as well as in the cross-members of tractor-trailer beds, and in certain other applications like the purlins of roofs. The beam 100 is advertised as providing an exceptional low-weight-per-foot hot-rolled solution.

Generally, such beams 100 have a size of approximately 4 lbs per linear foot, and have a tensile strength of approximately 80 ksi. These beams 100 are used in applications wherein a structural member needs to be both strong and light. For example, BANTAM BEAMs 100 may be used as a bed support for a semi-trailer. Such trailers may not have a front axle, and as such may be pulled by a semi-tractor as a tractor-trailer unit. It is necessary for this bed support to be strong, in order to ensure that the trailer has a bed floor strong enough to hold a desired quantity of weight (often 50,000 lbs) so that the bed can support the freight that the semi-tractor may be hauling. It is also necessary for this bed support to be light, in order to allow as much freight as possible to be hauled before the tractor-trailer is loaded to capacity (i.e. while the trailer is still light enough not to exceed the Department of Transportation's limits on gross vehicle weight/gross vehicle mass (GVW/GVM).)

The BANTAM BEAM 100 essentially serves as a representative example of high-tensile-strength beams that serves to exemplify the most common design philosophies for the use of high-tensile-strength beams. In particular, the BANTAM BEAM 100 has been constructed to have a diminutive size and surface area, in order to save weight. This, however, means that the BANTAM BEAM 100, along with other high-tensile-strength beams that have been designed similarly, is unsuitable for use in a solar farm foundation.

Specifically, such a beam is likely unsuitable for a solar farm foundation because the beam lacks sufficient surface area that is needed to prevent uplift of the beam, and thus of the solar array, in response to a ground force such as wind.

To provide some background, the size of a driven pile that is necessary in order to counter uplift is determined based on a determination of the ultimate bearing capacity. The ultimate bearing capacity may be any of three values, describing forces which may cause a pile to fail. First, the ultimate bearing capacity may be the maximum load of the pile $Q_{max}$, at which further penetration begins occurring (i.e. the pile is driven further into the ground) without an increase in the size of the load. Second, in cases where $Q_{max}$ is not clear, the ultimate bearing capacity may be a load at which a settlement of the pile by a distance of 0.1 times the length of the diameter of the pile occurs. (This means that, for large-diameter piles, settlement can be noticeable, which means that a sizeable factor of safety must generally be applied to the calculation of the ultimate bearing capacity in order to ensure that the pile does not settle noticeably.)

Third, the ultimate bearing capacity may be a calculated value $Q_f$ given by the sum of the end-bearing and the shaft resistances. It is noted that a pile loaded axially will carry the load partly by shear stresses, $t_s$, generated along the shaft of the pile and partly by normal stresses, $q_b$, generated at the base. As such, the ultimate capacity $Q_f$ of a pile is equal to the base capacity plus the skin friction acting on the shaft. This may be described by the relation $Q_f = Q_b + Q_s = A_b \cdot q_b + å (A_s \cdot t_s)$, wherein $Q_f$ is the ultimate capacity of the pile, $Q_b$ is the load on the pile due to normal stresses $q_b$ generated at the base of the pile (where $A_b$ is the area of the base), and $Q_s$ is the load on the pile due to shear stresses $t_s$ generated along the shaft of the pile (where $A_s$ is the surface area of the shaft within a soil layer, and å is the coefficient of friction).

As such, a smaller beam such as a BANTAM BEAM 100 is not likely to be able to prevent uplift. Likewise, a solar farm does not any structural requirements limiting the overall weight of the structure, and in particular does not have a structural requirement limiting the weight of the foundation. As such, neither the specifications of a high-tensile-strength beam such as the BANTAM BEAM 100, nor the design requirements of the solar array, would initially suggest the use of a high-tensile-strength beam in the foundation of the solar array.

Figure 2:
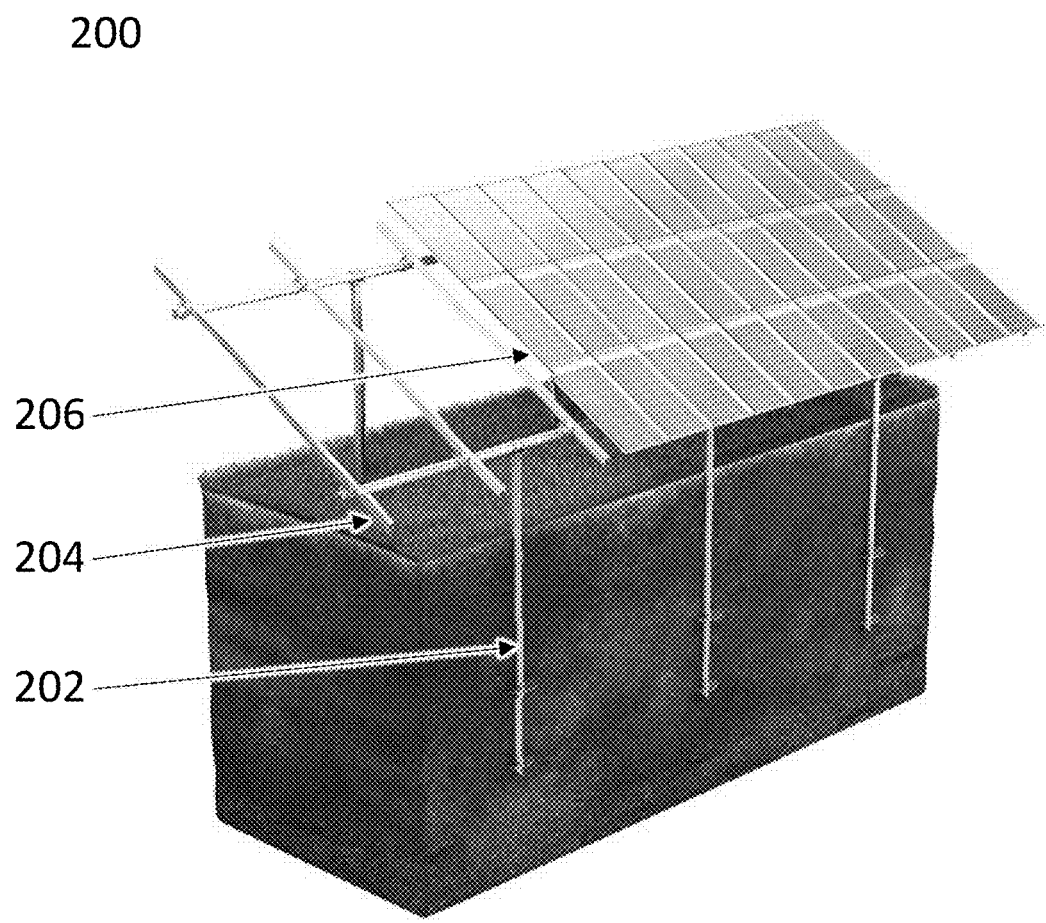
FIG. 2 is an exemplary embodiment of a solar array.

Turning next to exemplary FIG. 2, FIG. 2 displays an exemplary embodiment of a solar array 200 having an in-ground foundation, and particularly a solar array 200 that makes use of a helical screw pile 202 foundation. The helical screw pile 202 foundation may support a rack 204 and a panel 206 assembly. Specifically, the helical screw pile 202 foundation may be coupled to the rack 204 and may extend downward into the soil for a given distance. In other exemplary embodiments of a solar array 200 having an in-ground foundation, another type of foundation may be used in place of a helical screw pile 202 foundation, such as, as discussed previously, driven-steel I-beams.

According to an exemplary embodiment, the foundation 202 of a solar array 200 may function for several purposes. For example, as discussed, the foundation 202 may be intended to resist ground forces that may be caused by wind and snow loads, as well as (in some cases) seismic activity. The foundation 202 may also have a need for some kind of corrosion protection solution, due to the embedment of the foundation, in order to ensure compliance with the design life of the foundation 202, commonly between 25 and 30 years.

Now referring generally to the figures, according to an exemplary embodiment, one or more beams constructed from a higher grade of steel than grade 50 may be used instead of or in addition to a helical screw pile or driven steel I-beam foundation. Such beams may be referred to generally as "high-grade beams." For example, according to an exemplary embodiment, a grade 80 beam may be used. In some exemplary embodiments, high-grade beams may be of mixed levels of strength; for example, according to an exemplary embodiment, grade 80 beams may be used for some elements of a foundation (such as the outer supports for a rack 204) and grade 60 beams may be used for other elements of a foundation (such as the inner supports for a rack 204). In some embodiments, one or more of the beams used may be a proprietary beam, such as a BANTAM BEAM; such beams may be used instead of or in addition to other beams, if desired.

According to an exemplary embodiment, one or more high-grade beams may be prepared in a section size such as is currently used in solar farm construction. For example, according to an exemplary embodiment, one or more high-grade beams may be created in a standard guardrail post size (for example, a W6×8.5 or W6×9 size) so that existing techniques of driving the foundation posts of solar arrays, such as the use of a guardrail pile driver, may be used.

Such beams may offer superior performance in corrosive soils. For example, if a given section type is constructed based on grade 50 steel, but built using a higher steel grade, a percentage increase in structural life may be observed based on the percentage increase in tensile strength. For example, if a part is designed to grade 50, but grade 60 is instead used, the tensile strength will be increased by approximately 20%. The structural life of the post can thus be expected to similarly increase by approximately 20%. If the design of the post is to grade 50, but grade 80 is instead used, the increase in the structural life of the post will be approximately 60%.

A corrosion rate may generally be expressed in mils (i.e. thousandths of inches) per year, or in millimeters per year. In order to calculate the corrosion rate from metal loss, the following equation can be used: mm/y=87.6×(W/DAT), where W is equal to the weight loss in milligrams, D is equal to the metal density in g/cm$^3$, A is equal to the area of sample in cm$^2$, and T is equal to the time of exposure of the metal sample in hours. To convert corrosion rate between mils per year and millimeters per year (mm/y), the relation 1 mpy=0.0254 mm/y=25.4 microm/y can be used.

Because the rate at which corrosion occurs is based on the density and area of the sample rather than on its strength or other properties, it may be noted that, if a solar farm's foundation is designed based on the utilization of a steel grade of 50 ksi, but a higher steel grade is substituted for the 50 ksi steel in actual use, the foundation may see an increase in longevity proportional to the increase in strength. For example, if a steel that is 20% stronger (60 ksi) is used, the steel will have 20% more longevity in its structural life of use. (Alternatively, the steel beam section size could be reduced by up to 20% without a decrease in longevity, making it possible to both reduce the size of the steel beam and its longevity if there is reason to do so.) A higher-grade steel, such as grade 80 steel, may result in an increase of 60% more longevity to its structural life of use.

Such beams may also offer superior performance in other soils, such as rocky soils. For example, a high-grade beam, which may be constructed from a grade 80 steel instead of a grade 50 steel, may be used to positive effect in a rocky soil having a composition indicating a high likelihood of refusal with a smaller section. The structure of the high-grade beam may ensure that there is less likelihood of the beam undergoing material distortion (that is, there is less chance of the beam bending or breaking) while being driven, reducing the likelihood of an adverse effect of refusal. This ensures that solar projects involving in-ground foundations are more feasible in locations that would have high refusal rates, such as in locations with soils having large amounts of rock in the embedment.

The use of a high-grade beam may have beneficial financial results as compared to the in-ground beams currently used. In particular, the use of a high-tensile I-beam in an in-ground foundation application may use a reduced amount of steel as compared to an existing I-beam that has been sized to have an approximately similar useful life. This may further reduce the cost of using renewables, in particular solar, and make them more competitive with respect to the grid, further promoting their use and making them more economical to use in a wider variety of areas.

By way of example, the costs of making use of steel I-beam posts having different compositions, treatments, or strengths may be compared.

In an exemplary embodiment, hot-dip galvanization may be contemplated as a treatment for a steel I-beam post. It may be understood that, according to an exemplary embodiment, the cost to hot-dip galvanize a post may be based on the weight of the steel, rather than on its strength. For example, in an exemplary embodiment, it may cost approximately 15¢ per lb to hot-dip galvanize steel, whether that steel is 50 ksi, 60 ksi, 80 ksi, 100 ksi, or another strength, such as may be desired. (However, in some exemplary embodiments, a very high strength steel may be used, and hot-dip galvanization may risk hydrogen embrittlement of the steel; in such applications, a galvanization method other than hot-dip galvanization, such as, for example, electrogalvanizing, may be contemplated. Other galvanization methods may also be contemplated in any other applications, such as may be desired.)

Based on a price point of approximately 15¢ per lb to hot-dip galvanize steel, the cost of "black" non-coated 50 ksi steel may be understood to be approximately 45¢ per lb. The cost of galvanized 50 ksi steel may, thus, be understood to be approximately 60¢ per lb. Likewise, the cost of "black" non-coated 80 ksi steel may be understood to be approximately 47¢ per lb, and the cost of galvanized 80 ksi steel may, thus, be understood to be approximately 62¢ per lb.

This means that, if an exemplary embodiment of a solar array design calls for a W6×8.5×12' grade 50 steel post foundation, several options are available. A first option may be to construct the solar array based on current practices, and use, as the steel post, a W6×8.5×12' 50 ksi ASTM A123 galvanized beam, costing approximately $0.60/lb. This beam would be expected to have a cost of approximately $61.20. A second option may be to construct the solar array so that the steel post includes an additional amount of sacrificial steel; for example, a W6×10.5×12' post constructed from 50 ksi (black, i.e. ungalvanized) material may be used, which may cost approximately $0.45/lb. The beam would be expected to have a cost of approximately $56.70.

A third option may be to construct the solar array so that the steel post is constructed from higher-strength steel (and may still include some quantity of sacrificial steel, as desired). For example, according to an exemplary embodiment, a W6×9×12" 80 ksi (black) beam may be used, which may cost approximately $0.47/lb. The beam would be expected to have a cost of approximately $50.76. Finally, in a fourth option, the solar array may be constructed so that the steel post is constructed from higher-strength galvanized steel; for example, according to an exemplary embodiment, a W6×7×12' 80 ksi ASTM A123 beam (i.e. a galvanized beam) may be used, which may cost approximately $0.62/lbs. The beam would be expected to have a cost of approximately $52.08.

It is noted that only option 1, specifically the use of 50 ksi beams created according to ASTM A123, appears to be in common use. While in rare instances solar array projects appear to have been built using ungalvanized 50 ksi steel as per option 2—for example, this appears to have been done in some desert solar array projects where galvanic corrosion is less of a concern—the use of ungalvanized steel is extremely rare, and is not considered as a viable option by the majority of builders for projects outside of those locations. Options 3 and 4, which each embody an exemplary embodiment of the present invention, each result in a substantial cost savings.

It may be understood that other benefits other than cost savings may be evident from one option or the other. For example, a galvanized post such as discussed in Option 4 may be regarded as desirable for the reasons that the galvanized post is rust resistant, cleaner looking, and consistent with the look of the rest of the solar array. It may also be understood that a galvanized post constructed from high-strength steel may have a useful life that is considerably longer than is typically required by design, and often considerably longer than the useful life of the solar panel or solar module. As such, the use of such a galvanized post may allow for the possibility of successive generations of modules, meaning that the long-term cost of the galvanized post may be cheaper if the modules are intended to be replaced after they have worn out. Meanwhile, a "black" steel post such as discussed in Option 3 may outlast the required design life (which may be, for example, the anticipated design life of the solar module) but may not have a long enough life to allow for successive generations of modules to be used with the "black" steel post. The "black" steel post may also be more susceptible to rust, which may be undesirable in certain applications; for example, if the solar array is intended to be in a high-traffic area, such as a public park, it may be unaesthetic to have visible rust on any parts of the surface of the solar array.

By way of further example, the costs of construction of a 1 MW solar project built according to current standards (ASTM A123) and a 1 MW solar project built according to an exemplary embodiment set forth herein may be compared.

In a first example, a 1 MW solar project may be constructed according to current standards. As per ASTM standard A123, the beams used in the foundation may be constructed from 50 ksi galvanized steel. The project may thus be designed with (500) W6×9×12' steel grade 50 I-beams per the structural and ground force load requirements.

Calculating the costs per post and the total cost, the cost per post may be calculated at approximately $0.60 per lb of galvanized steel*108 lbs (W6×9×12')=$64.80/post. This yields a total cost of $64.80/post*(500) posts=$32,400 (steel material cost).

In a second example, a 1 MW solar project having the same design requirements may be constructed according to an exemplary embodiment set forth herein. Such a project may make use of (500) W6×7×12' steel grade 80 I-beams, having a weight of 84 lbs. Calculating the costs per post and the total cost, the cost per post may be calculated at approximately $0.62/lbs (based on an increased per/lbs cost for higher KSI)=$52.08/post. This yields a total cost of $52.08/post×(500) posts=$26,040 (steel material cost). (It is noted that this is based on some level of estimation, as there appears to be no current production or no significant current production of high tensile W6 wide flange beams of this size, such as W6×7 (or ×8.5, ×9, ×12, ×15, ×20, ×25, and so forth). Such estimates are made based on the estimated cost of the steel.)

Comparing example 2 to example 1, it may be observed that example 2 results in a monetary savings of $6,360. Further, designing the solar project as set forth in Example 2 results in an increase in the structural longevity of the steel's design by 30% and a material savings of 12,000 lbs of steel.

Given the large-scale expansion of solar generation plants throughout the United States and the world, this is a significant savings. For example, there are currently over 5 gigawatts (5,000 mw) in pre-construction throughout the US. If similar cost and material savings to those described in this example could be achieved, the resulting savings would be 60 million lbs of unneeded steel to be used for other important uses, and $36 million saved for other renewable projects.

In some exemplary embodiments, costs or material savings from the replacement of existing posts with high-tensile strength I-beam posts may vary. For example, in some exemplary applications, existing practice may be to make use of more complex piles such as hemispherical screws or helical piles in order to penetrate tougher ground, and it may be possible to replace these piles with high-tensile-strength I-beam piles at a substantial cost savings.

In other cases, C-channel posts or other roll-formed beams may be used instead of I-beams, due to the lower cost typically associated with C-channel posts. Such posts may be more resistant to transverse bending but may be more susceptible to buckling than I-beams having approximately equal sectional areas, meaning that it may be preferable to use them based on some anticipated loads and may be less preferable to use them based on other anticipated loads. The replacement of the C-channel posts with high-tensile I-beams may thus yield less of a savings in many cases. However, C-channel posts may have a shorter useful life even if galvanized; in many cases, continuous sheet galvanizing may be used in order to protect C-channel posts, which may be more limited and ill-suited to high-corrosion applications than standard hot-dip galvanization methods. This may mean that it becomes even more favorable to use a high-tensile I-beam in the long run.

It may also be contemplated to construct a different type of post, other than an I-beam-type post, from a high strength steel. For example, in an exemplary embodiment, a C-channel post, or another alternative pile design, could be constructed from a higher-tensile-strength steel, if desired.

Further refinements may be made in order to further reduce costs. For example, at the edge of an individual solar array, or at the edge of a solar farm, the wind load is more intense than on piles nearer the center of the solar array or nearer the center of the solar farm. As such, heavier section type posts are often used, particularly at the edges of solar farms. This is due to several factors, but primarily the increased uplift caused by wind, which may exert a force on the solar array tending to pull the solar array out of the ground. This typically requires that the posts nearer the edges of the solar array or near the edges of the solar farm be thickened, with more embedded post surface area, in order to ensure that additional skin friction from the post counters the higher uplift force on the array that is created by wind.

At present, a thicker pile must be used in order to ensure that the pile has adequate surface area. A longer pile of the same section type as is used in the interior of the array cannot be used, because a longer pile constructed from the same material type will tend to experience higher amounts of head deflection when a lateral force is applied parallel to the surface of the ground and perpendicular to the length of the pile. (Such a force may often be applied due to wind, or due to some other ground force.) In general, the equation $$E_p I_p \frac{d^4 y}{dx^4} + P_x \frac{d^2 y}{dx^2} + E_{py} y - W = 0$$

may hold for a laterally loaded pile, wherein $E_p I_p$ is the bending stiffness of the pile, $P_x$ is the axial load on the pile head, y is the lateral deflection of the pile, $E_{py}$ is the soil reaction modulus (based on an experimentally determined p-y curve for the soil), and W is the distributed load down some length of the pile. Likewise, the equation $$E_p I_p \frac{d^3 y}{dx^3} + P_x \frac{dy}{dx} = V$$

gives V, the shear in the pile, and the equation $$E_p I_p \frac{d^2 y}{dx^2} = M$$

gives M, the bending moment experienced by the pile.

Using a longer pile typically means that the maximum bending moment that the pile experiences will be greater in magnitude, enhancing the risk of failure of the pile. (A general rule of thumb in pile design is that, if the pile is designed with too short a length, there is a greater risk that the soil will fail, while if the pile is designed with too great a length, there is a greater risk that the pile will fail.) The increased thickness of the exterior pile sometimes means that it is incompatible with the driver that is used to drive the interior pile, or means that the driver used to drive the interior pile must be more complex in order to drive both sizes of pile.

The designs of the exterior of the array may thus be benefited by the use of a high-tensile I-beam. In an exemplary embodiment, an exterior pile may be designed such that it is the same thickness as the interior piles, but is longer than the interior piles, which may be used to increase the embedded surface area of the exterior pile. This may in turn increase the total skin friction that is being applied to the pile to prevent uplift. This may accomplish the same task as the thicker beams currently in use, with the added benefit that the longer beam having the same cross-sectional size as the interior piles may be driven using the same driver as the interior piles. The downside of using a longer beam, namely the fact that the beam may be subject to increased levels of stress due to the maximum bending moment on the beam being higher, may be mitigated by the use of a higher-grade steel.

In some exemplary embodiments, however, an exterior pile may make use of a high-tensile beam than is thicker than the beams used for the interior piles. In some exemplary embodiments, this may be a beam that is only slightly thicker than the beams used for the interior piles, while in other exemplary embodiments the beam used for the exterior piles may be thicker than the beams used for the interior piles by approximately the same margin as is used in present solar arrays that make use of piles constructed from grade 50 steel. In such embodiments, the length of the exterior pile may also vary; for example, the exterior pile may be the same length as the interior piles, may be both thicker and longer than the interior piles (and may, for example, be longer than the interior piles to a lesser extent than would be the case if the exterior pile was constructed to have the same thickness as the interior piles), or may be any other length as may be desired.

This may again result in cost savings that may be demonstrated through example. In example 3, according to an exemplary embodiment, a given solar farm project may be constructed using 5,000 posts, with 20 percent of these posts being exterior posts. This means that 4000 of these posts would be interior posts, and 1000 of these posts would be exterior posts.

In a first case, a lower-grade steel may be used as per current convention. The interior posts may have sizes of W6×8.5×12' and may be constructed from grade 50 steel (50 ksi). Each post may thus have a weight of 102 lbs. With 4,000 of these posts being necessary, and a price point of $0.60/lbs being used for grade 50 steel, the total cost of the interior posts will be 102 lbs*4,000=408,000 lbs, which when multiplied by $0.60/lbs yields a total cost of $244,800 for the interior posts.

The exterior posts may have a higher thickness, and may thus have a size of W6×12×12'. They may likewise be constructed from grade 50 steel (50 ksi). Each post may in this case have a weight of 144 lbs. With 1,000 of these posts being necessary, and a price point of $0.60/lbs being used for grade 50 steel, the total cost of the interior posts will be 144 lbs*1,000=144,000 lbs, which when multiplied by $0.60/lbs yields a total cost of $86,400 for the exterior posts. This means that, for a solar farm project constructed according to conventional designs, the total cost of the posts (both interior and exterior) may be $331,200.

In a second case, however, a higher-grade steel may be used. The interior posts may be decreased in cross-sectional size due to the use of the higher-grade steel. As such, the interior posts may have sizes of W6×7×12' and may be constructed from grade 80 steel (80 ksi). Each post may thus have a weight of 84 lbs. With 4,000 of these posts being necessary, and a price point of $0.62/lbs being used for grade 80 steel, the total cost of the interior posts will be 84 lbs*4,000=336,000 lbs, which when multiplied by $0.62/lbs yields a total cost of $208,320 for the interior posts.

The exterior posts may have a higher thickness and higher length, as discussed above; specifically, the exterior posts may have a decreased section size due to the higher ksi steel used, and may have an increased length in order to provide more surface area. The exterior posts may thus have a size of W6×8.5×14'. They may likewise be constructed from grade 80 steel (80 ksi). Each post may in this case have a weight of 119 lbs. With 1,000 of these posts being necessary, and a price point of $0.62/lbs being used for grade 80 steel, the total cost of the interior posts will be 119 lbs*1,000=119,000 lbs, which when multiplied by $0.62/lbs yields a total cost of $73,700 for the exterior posts. This means that, for a solar farm project constructed according to conventional designs, the total cost of the posts (both interior and exterior) may be $282,100.

This means that, comparing case 2 to case 1, there is a substantial savings in both the cost of the steel used and in the quantity of steel used. Constructing the solar farm according to case 2, i.e. with the use of a grade 80 steel instead of a grade 50 steel and with the piles being constructed with the dimensions used in the example, yields a cost savings of $49,100 and a material savings of 97,000 lbs.

Other cost-saving measures may also be contemplated. For example, present solar array designs often arrange foundation piles in rows, with a certain number of piles being provided per row. 11 piles per row is common. With the use of a high-tensile or ultra-high-tensile steel, the number of piles per row can be reduced; for example, instead of 11 piles per row, only 7 piles per row could be used, further saving material. In some embodiments, the piles per row could be varied and the thickness and/or length of each pile could also be varied, as may be desired.

As such, a solar array having a foundation constructed from a high or ultra-high-strength steel may offer significant benefits and have significant industrial applicability. Such applications have not been previously considered for solar arrays, because the overall weight of the structure has not been a fundamental design requirement, meaning that there has been no obvious reason to use a more expensive material having a high strength-to-weight ratio. In this application, the high-strength or ultra-high-strength steel may offer improvements above and beyond what would be predicted, namely increased longevity of the structure with regards to corrosion.

Further, as noted, there does not appear to be current production of, or significant current production of, high tensile W6 wide flange beams of the desired size, such as W6×7 or other such sizes. Thus, there is likewise no obvious reason to design a structure to make use of a component that does not yet exist and is not yet produced. However, according to exemplary embodiments of the present application, the incorporation of such beams into the foundations of solar arrays could create a significant enough demand for high-tensile W6 wide flange beams that high-tensile W6 wide flange beams could be used for other applications (such as, for example, guardrail posts), ensuring that the construction of solar arrays having foundations constructed from a high or ultra-high-strength steel may have even greater industrial applicability.

According to an exemplary embodiment, a high-grade beam such as is described herein may be used in other applications for a solar array rather than solely in an in-ground foundation. For example, according to an exemplary embodiment, a high-grade beam may be used as part of a ballasted foundation, and may be used to connect the solar array to a concrete block. This may improve the ability of the ballasted foundation to survive ground effects, such as wind or weather, and may thus promote a longer useful life for ballasted foundations.

In an exemplary embodiment, a high-grade beam such as is described here may be used as a guardrail post instead of in a solar array. For example, a grade 80 guardrail post that has been formed from a high-grade beam may have an increased structural life, and may, for example, have an increased length of time before replacement of approximately 60%. This would reduce the cost of guardrail maintenance, and would greatly reduce the burden on taxpayers for continued infrastructure maintenance.

Figure 3:
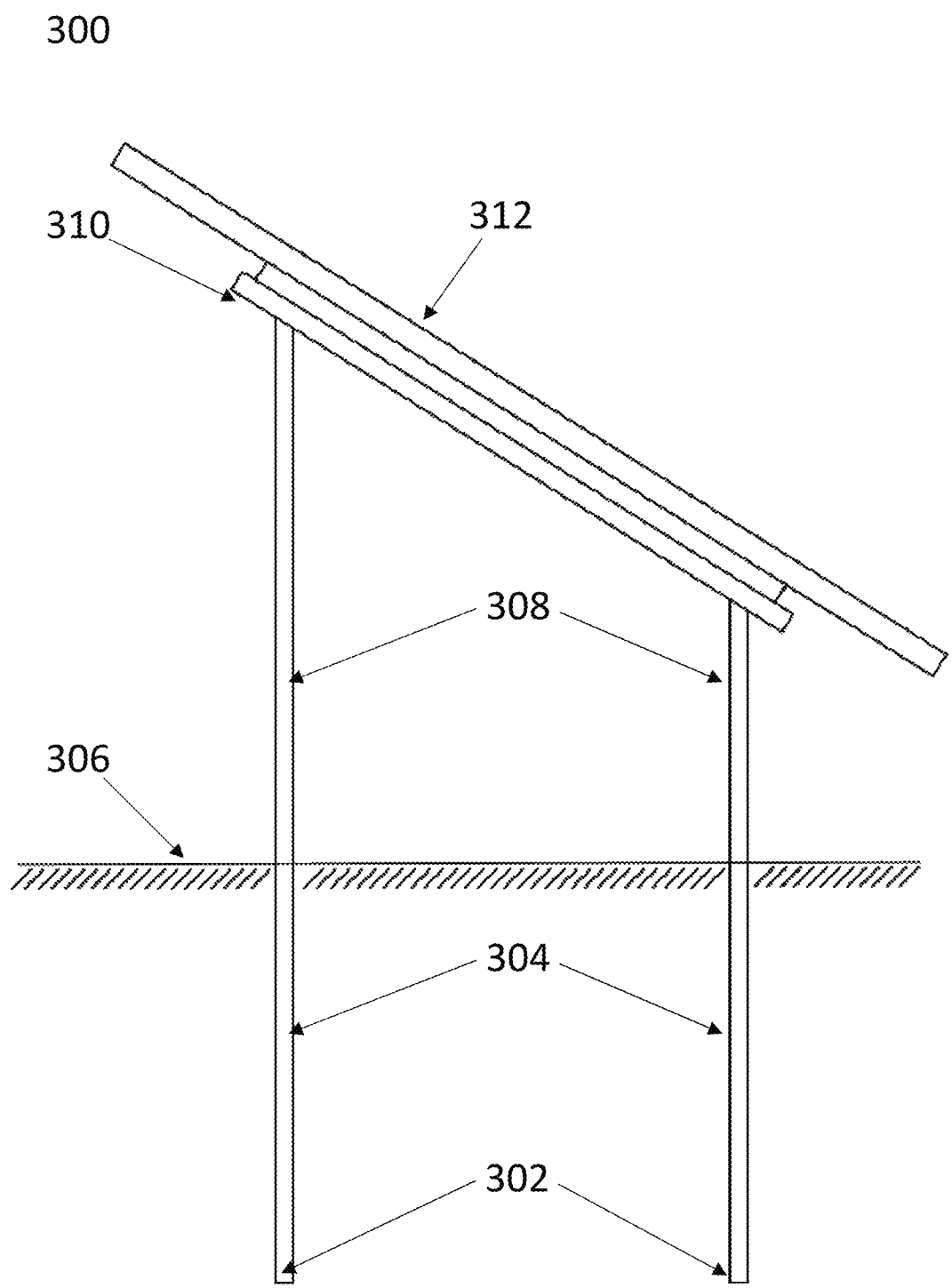
FIG. 3 is an exemplary embodiment of a solar array incorporating a plurality of high-grade beams.

Referring now to FIG. 3, an exemplary embodiment of a solar array 300 which incorporates one or more high-grade beams 304, 308 as part of its structure may be disclosed. According to an exemplary embodiment, the rack portion 310 of a solar array 300 may be supported by one or more high-grade beams 304, 308, which may be sunk into the ground 306. The rack portion 310 of a solar array 300 may support one or more solar panels 312.

In an exemplary embodiment, the ends 302 of the high-grade beams 304, 308 may be any shape. For example, in an exemplary embodiment, the ends 302 may be flat or may be pointed for greater penetration. In another exemplary embodiment, the ends 302 may be expandable or may otherwise have a width greater than that of the high-grade beams 304, 308 in order to help prevent shifting or removal of the high-grade beams 304, 308.

In an exemplary embodiment, the high-grade beams 304, 308 may have multiple parts, such as an above-ground beam 308 and a below-ground beam 304. Above-ground beam 308 and below-ground beam 304 may be coupled to one another and may have similar or different attributes, as may be desired. In another exemplary embodiment, the high-grade beams 304, 308 may be single parts but may have different attributes for an above-ground portion 308 and a below-ground portion 304. For example, according to an exemplary embodiment, the below-ground portion 304 may be roughened before hot dip coating, may be subject to hot dip coating in a different anode preparation, may have anode material added by another technique than hot-dip coating, or may otherwise have a thicker anode layer than the above-ground portion, 308, if desired. Alternatively, it may be desired to have the above-ground portion 308 have a thicker anode layer, if desired.

Figure 4:
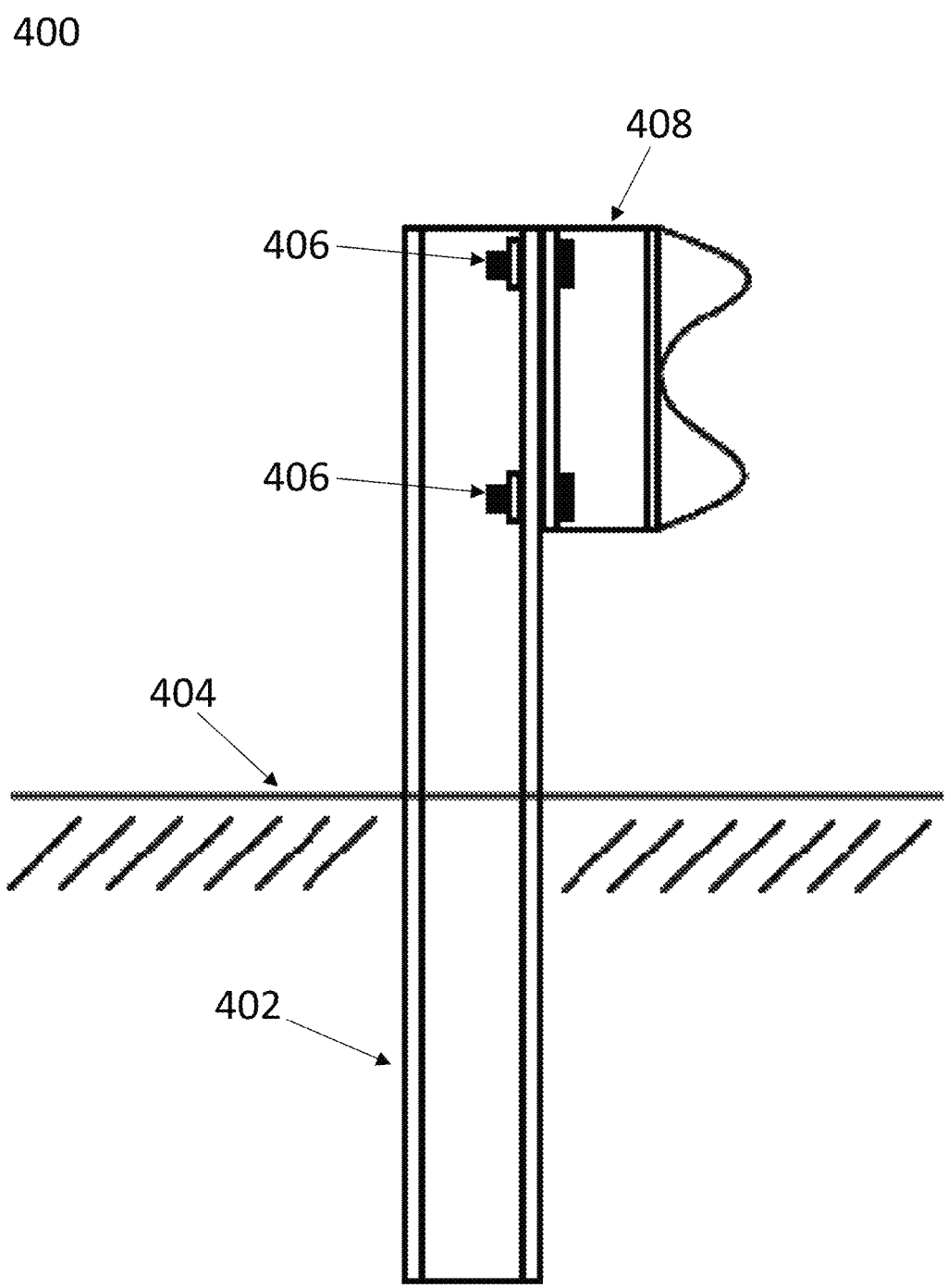
FIG. 4 is an exemplary embodiment of a guardrail.

Turning now to exemplary FIG. 4, FIG. 4 displays an exemplary embodiment of a guardrail assembly 400. According to an exemplary embodiment, a guardrail assembly 400 may be formed on a guardrail post 402, which may be sunk into the ground 404. Guardrail post 402 may then be coupled to a guardrail 408 by a plurality of connectors 406.

According to an exemplary embodiment, a high-grade beam may be used as a guardrail post 402. According to an exemplary embodiment, the high-grade beam used as a guardrail post 402 may have similar attributes to a high-grade beam used as a post for a solar array foundation, and may, for example, be constructed out of a high-grade steel (such as grade 80 steel). For example, according to an exemplary embodiment, a guardrail post 402 may have anode material added, and may have similar or different properties on each of the below-ground and above-ground portions of the guardrail post 402, if desired.

Figure 5A:
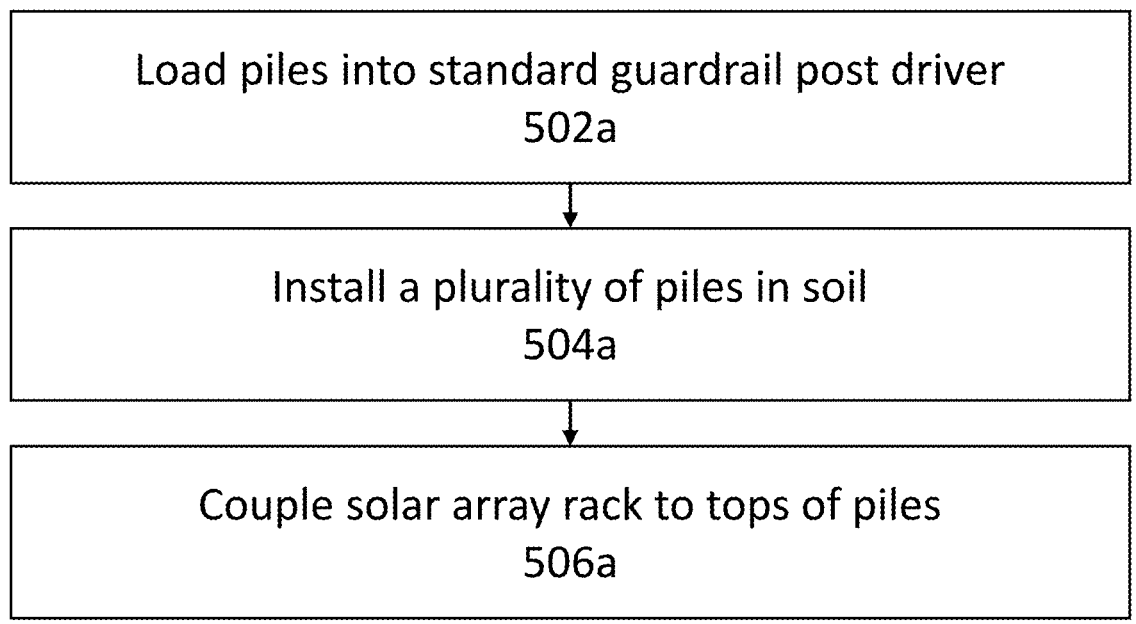
FIG. 5A is an exemplary embodiment of a method of installing a solar array.

Turning now to exemplary FIG. 5A, FIG. 5A displays a flowchart depicting an exemplary method of installing a solar array 500a. According to an exemplary embodiment, in a first step 502a, piles may be loaded into a standard guardrail post driver. In a next step 504a, the piles may be installed in a surface using the standard guardrail post driver. In a next step 506a, a solar array rack may be coupled to the tops of the piles (or elsewhere on the piles).

Figure 5B:
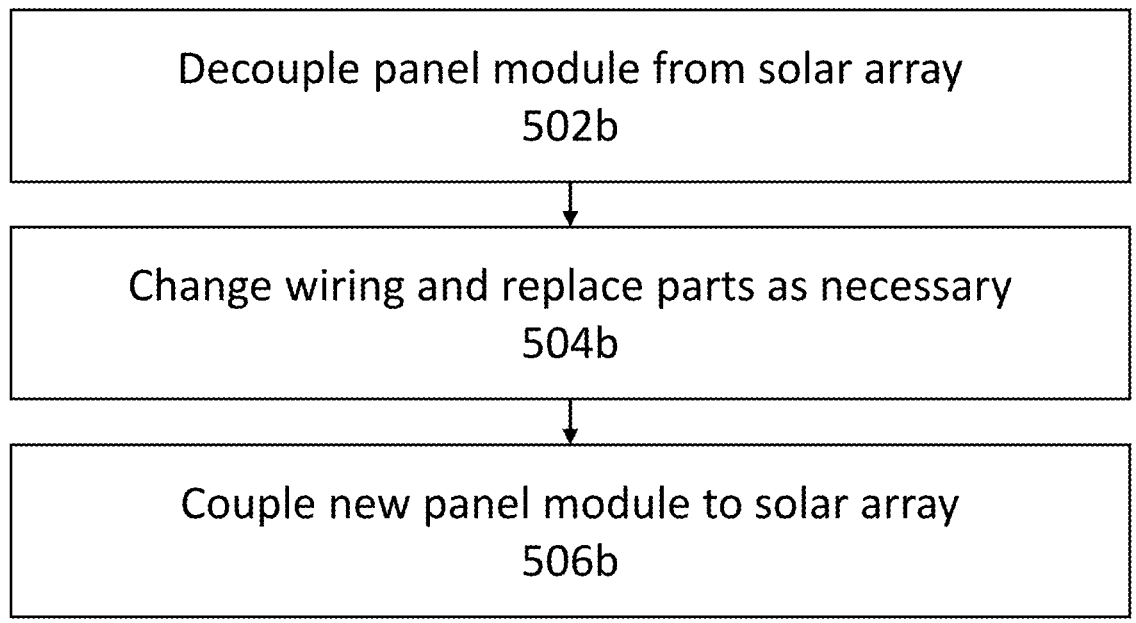
FIG. 5B is an exemplary embodiment of a method of replacing a solar panel module.
Figure 6:
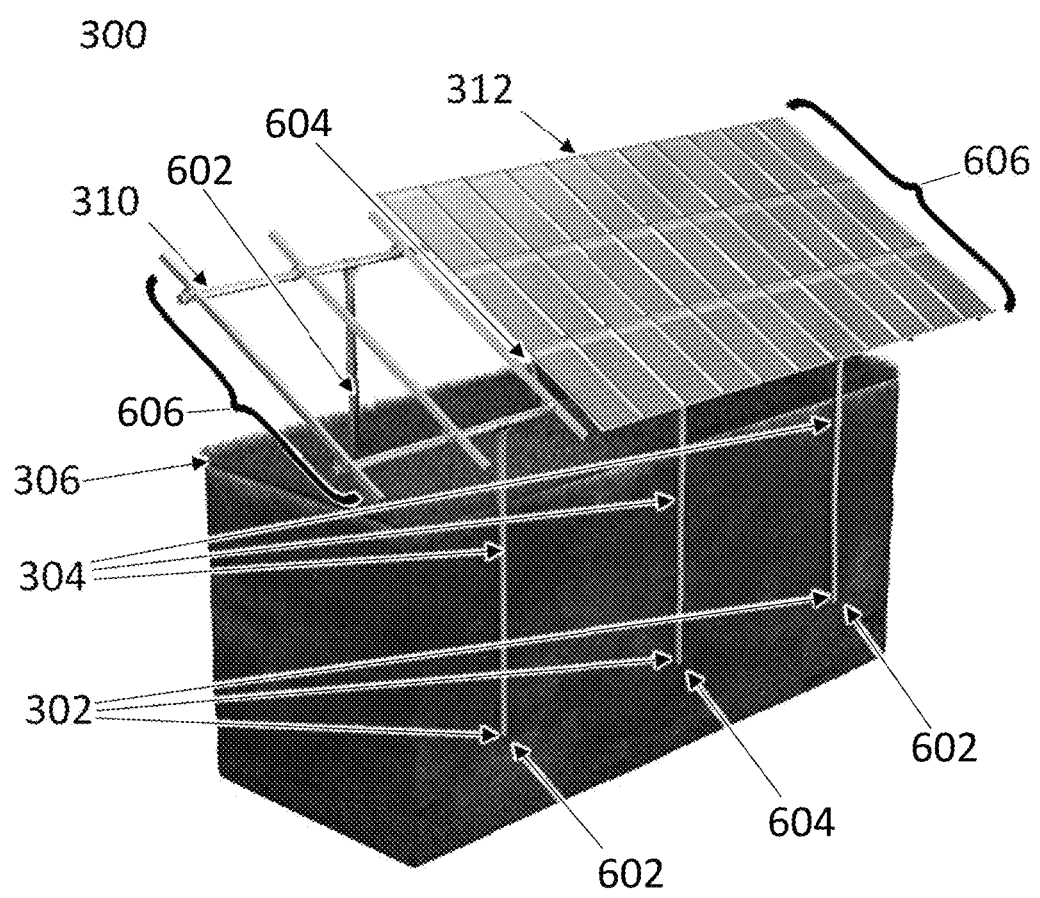
FIG. 6 is an exemplary embodiment of a solar array incorporating a plurality of high-grade beams.

Turning now to exemplary FIG. 5B, FIG. 5B displays a flowchart depicting an exemplary method of replacing a module of a solar array 500b. According to an exemplary embodiment, a method of replacing a module of a solar array 500b may be made possible by constructing the frame of the solar array to have a longer lifespan than the solar panels or solar module supported by the frame. (It may be understood that, in some exemplary embodiments, photovoltaic solar panels may degrade by approximately 1% of maximum capacity for every year of use, and that panels may be considered to have a lifespan of approximately 25 years, at which time they may produce around 80% of rated power. Other embodiments are of course possible.)

In some exemplary embodiments, a method of replacing a module of a solar array 500b may be facilitated by, for example, making use of a heavier galvanized steel, such as 80 ksi steel galvanized as per ASTM A123, in the frame of the solar array or in elements of the frame of the solar array such as a foundation post, which may increase the lifespan of the frame to the point where it may last multiple lengths of the lifespan of the solar module and make replacement of the solar module worthwhile. According to an exemplary embodiment, a solar array may be constructed so that a solar module can be readily removed from the frame of the solar array 502b. Once the solar module has been removed from the frame of the solar array 502b, parts may be replaced as necessary, and the wiring may be replaced as necessary 504b. A new solar module may then be put in place of the old solar module and coupled back to the frame of the solar array 506b. This may further reduce the structural costs associated with solar arrays and may thus further enhance the competitiveness of solar arrays as compared to other power sources.

In still other embodiments, a solar array 300 can be formed incorporating a plurality of high-grade beams 304. In some exemplary embodiments, the solar array 300 may have different piles 304 on the outside 602 and inside 604 of the solar array, with the piles 602 on the outside ends 606 of the solar array 300 being stronger than the piles 604 on the inside portion of the solar array 300.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A solar array for corrosive soil, comprising:
a solar panel;
a rack configured to support the solar panel;
a plurality of supporting posts, each supporting post comprising an I-beam, the plurality of supporting posts constructed from at least a grade 60 steel and having a yield strength of at least 60 ksi;
wherein each end of the plurality of supporting posts comprises at least one of:
a flat-tipped element having an I-beam cross-section and separated from each other end of the plurality of supporting posts;
a pointed-tipped element having the I-beam cross-section and separated from each other end of the plurality of supporting posts; and
an expandable element configured to expand from the I-beam cross-section after being driven, and further wherein the plurality of supporting posts are driven into corrosive soil.

2. The solar array of claim 1, wherein the I-beam is one of size W6 or W8.

3. The solar array of claim 1, wherein each supporting post in the plurality of supporting posts is disposed proximate to either of: a first narrow end of the solar array, and a second narrow end of the solar array, and
wherein the solar array further comprises a plurality of inside supporting posts, each of the plurality of inside supporting posts disposed between the plurality of supporting posts.

4. The solar array of claim 1, wherein each of the plurality of supporting posts further comprises a protective layer comprising at least one of a hot dip galvanic coating or a protective epoxy layer.

* * * * *